United States Patent
Choi et al.

(10) Patent No.: US 9,673,854 B2
(45) Date of Patent: Jun. 6, 2017

(54) METHOD FOR PILOT SIGNAL BASED SELF-INTEFERENCE CANCELLATION TUNING

(71) Applicant: Kumu Networks, Inc., Sunnyvale, CA (US)

(72) Inventors: Jung-Il Choi, Sunnyvale, CA (US); Mayank Jain, Sunnyvale, CA (US); Jeff Mehlman, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/011,093

(22) Filed: Jan. 29, 2016

(65) Prior Publication Data

US 2016/0226535 A1 Aug. 4, 2016

Related U.S. Application Data

(60) Provisional application No. 62/109,126, filed on Jan. 29, 2015.

(51) Int. Cl.
*H04B 1/00* (2006.01)
*H04B 17/00* (2015.01)
*H04B 1/525* (2015.01)

(52) U.S. Cl.
CPC .................... *H04B 1/525* (2013.01)

(58) Field of Classification Search
CPC ... H04B 1/10; H04B 1/40; H04B 1/44; H04B 1/48; H04B 1/56; H04B 1/525;
(Continued)

(56) References Cited

U.S. PATENT DOCUMENTS 3,922,617 A 11/1975 Denniston et al.
4,321,624 A 3/1982 Gibson et al.
(Continued)

FOREIGN PATENT DOCUMENTS

EP 0755141 B1 10/2005
EP 1959625 B1 2/2009
(Continued)

OTHER PUBLICATIONS

Josph G. McMichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.*

(Continued)

*Primary Examiner* — Quochien B Vuong
(74) *Attorney, Agent, or Firm* — Jeffrey Schox; Thomas Gwinn

(57) ABSTRACT

A method for pilot signal based self-interference cancellation tuning includes detecting a tuning trigger and in response to the tuning trigger, generating a pilot transmit signal according to the trigger data; and transmitting, at the transmitter, the pilot transmit signal; receiving, at the receiver, a pilot receive signal; cancelling, at the self-interference canceller, a portion of self-interference in the receive pilot signal, resulting in a composite pilot signal; analyzing the composite pilot signal; and tuning a configuration parameter of the self-interference canceller, based on analysis of the composite pilot signal, resulting in reduced self-interference in the composite pilot signal.

16 Claims, 8 Drawing Sheets

(58) Field of Classification Search
CPC .. H04B 1/0475; H04B 1/1027; H04B 1/7107;
H04B 1/71075; H04B 3/23; H04B
7/15585; H04B 15/00; H04B 17/345;
H04L 5/14; H04L 5/1461
USPC ......... 455/63.1, 115.1, 115.2, 295, 296, 423,
455/425; 370/277, 278, 282, 286, 292;
375/346
See application file for complete search history.

(56) References Cited

U.S. PATENT DOCUMENTS

| | | |
|---|---|---|
| 4,952,193 A | 8/1990 | Talwar |
| 5,212,827 A | 5/1993 | Meszko et al. |
| 5,691,978 A | 11/1997 | Kenworthy |
| 5,734,967 A | 3/1998 | Kotzin et al. |
| 5,790,658 A | 8/1998 | Yip et al. |
| 5,818,385 A | 10/1998 | Bartholomew |
| 5,930,301 A | 7/1999 | Chester et al. |
| 6,215,812 B1 | 4/2001 | Young et al. |
| 6,240,150 B1 | 5/2001 | Darveau et al. |
| 6,411,250 B1 | 6/2002 | Oswald et al. |
| 6,539,204 B1 | 3/2003 | Marsh et al. |
| 6,567,649 B2 | 5/2003 | Souissi |
| 6,639,551 B2 | 10/2003 | Li et al. |
| 6,657,950 B1 | 12/2003 | Jones et al. |
| 6,725,017 B2 | 4/2004 | Blount et al. |
| 6,965,657 B1 | 11/2005 | Rezvani et al. |
| 7,336,940 B2 | 2/2008 | Smithson |
| 7,349,505 B2 | 3/2008 | Blount et al. |
| 7,362,257 B2 | 4/2008 | Bruzzone et al. |
| 7,426,242 B2 | 9/2008 | Thesling |
| 7,509,100 B2 | 3/2009 | Toncich |
| 7,778,611 B2 * | 8/2010 | Asai ................ H04B 1/525 455/78 |
| 7,869,527 B2 | 1/2011 | Vetter et al. |
| 8,005,235 B2 | 8/2011 | Rebandt et al. |
| 8,027,642 B2 | 9/2011 | Proctor et al. |
| 8,055,235 B1 | 11/2011 | Gupta et al. |
| 8,060,803 B2 | 11/2011 | Kim |
| 8,086,191 B2 | 12/2011 | Fukuda et al. |
| 8,155,595 B2 | 4/2012 | Sahin et al. |
| 8,175,535 B2 | 5/2012 | Mu |
| 8,179,990 B2 | 5/2012 | Orlik et al. |
| 8,218,697 B2 | 7/2012 | Guess et al. |
| 8,331,477 B2 | 12/2012 | Huang et al. |
| 8,351,533 B2 | 1/2013 | Shrivastava et al. |
| 8,385,871 B2 | 2/2013 | Wyville |
| 8,422,540 B1 | 4/2013 | Negus et al. |
| 8,755,756 B1 | 6/2014 | Zhang et al. |
| 8,842,584 B2 * | 9/2014 | Jana ................ H04L 5/143 370/278 |
| 8,995,410 B2 | 3/2015 | Balan et al. |
| 9,019,849 B2 | 4/2015 | Hui et al. |
| 9,042,838 B2 | 5/2015 | Braithwaite |
| 9,054,795 B2 | 6/2015 | Choi et al. |
| 9,077,421 B1 | 7/2015 | Mehlman et al. |
| 9,124,475 B2 | 9/2015 | Li et al. |
| 9,136,883 B1 * | 9/2015 | Moher ................ H04B 1/0042 |
| 9,184,902 B2 * | 11/2015 | Khojastepour ........... H04L 5/14 |
| 9,231,647 B2 * | 1/2016 | Polydoros ................ H04B 1/62 |
| 9,312,895 B1 | 4/2016 | Gupta et al. |
| 2002/0034191 A1 | 3/2002 | Shattil |
| 2002/0064245 A1 | 5/2002 | McCorkle |
| 2002/0154717 A1 | 10/2002 | Shima et al. |
| 2002/0172265 A1 | 11/2002 | Kenney |
| 2003/0031279 A1 | 2/2003 | Blount et al. |
| 2003/0099287 A1 | 5/2003 | Arambepola |
| 2003/0104787 A1 | 6/2003 | Blount et al. |
| 2003/0148748 A1 | 8/2003 | Shah |
| 2004/0106381 A1 | 6/2004 | Tiller |
| 2004/0266378 A1 | 12/2004 | Fukamachi et al. |
| 2005/0078743 A1 | 4/2005 | Shohara |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0250466 A1 | 11/2005 | Varma et al. |
| 2005/0254555 A1 | 11/2005 | Teague |
| 2005/0282500 A1 | 12/2005 | Wang et al. |
| 2006/0029124 A1 | 2/2006 | Grant et al. |
| 2006/0030277 A1 | 2/2006 | Cyr et al. |
| 2006/0058022 A1 | 3/2006 | Webster et al. |
| 2006/0083297 A1 | 4/2006 | Yan et al. |
| 2006/0209754 A1 | 9/2006 | Ji et al. |
| 2006/0273853 A1 | 12/2006 | Suzuki et al. |
| 2007/0018722 A1 | 1/2007 | Jaenecke |
| 2007/0105509 A1 | 5/2007 | Muhammad et al. |
| 2007/0207747 A1 | 9/2007 | Johnson et al. |
| 2007/0249314 A1 | 10/2007 | Sanders et al. |
| 2007/0274372 A1 | 11/2007 | Asai et al. |
| 2008/0037801 A1 | 2/2008 | Alves et al. |
| 2008/0089397 A1 | 4/2008 | Vetter et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0192636 A1 | 8/2008 | Briscoe et al. |
| 2008/0219339 A1 | 9/2008 | Chrabieh et al. |
| 2008/0219377 A1 | 9/2008 | Nisbet |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0115912 A1 | 5/2009 | Liou et al. |
| 2009/0180404 A1 | 7/2009 | Jung et al. |
| 2009/0186582 A1 | 7/2009 | Muhammad et al. |
| 2009/0221231 A1 | 9/2009 | Weng et al. |
| 2009/0303908 A1 | 12/2009 | Deb et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0103900 A1 | 4/2010 | Yeh et al. |
| 2010/0117693 A1 | 5/2010 | Lorg et al. |
| 2010/0136900 A1 | 6/2010 | Seki |
| 2010/0150033 A1 | 6/2010 | Zinser et al. |
| 2010/0150070 A1 | 6/2010 | Park et al. |
| 2010/0159858 A1 | 6/2010 | Dent et al. |
| 2010/0215124 A1 | 8/2010 | Zeong et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0279602 A1 | 11/2010 | Larsson et al. |
| 2010/0295716 A1 | 11/2010 | Yamaki et al. |
| 2011/0013684 A1 | 1/2011 | Semenov et al. |
| 2011/0026509 A1 | 2/2011 | Tanaka |
| 2011/0081880 A1 | 4/2011 | Ahn |
| 2011/0149714 A1 | 6/2011 | Rimini et al. |
| 2011/0171922 A1 | 7/2011 | Kim et al. |
| 2011/0216813 A1 | 9/2011 | Baldemair et al. |
| 2011/0222631 A1 | 9/2011 | Jong |
| 2011/0243202 A1 | 10/2011 | Lakkis |
| 2011/0250858 A1 | 10/2011 | Jain et al. |
| 2011/0254639 A1 | 10/2011 | Tsutsumi et al. |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0005284 A1 | 1/2013 | Dalipi |
| 2013/0044791 A1 | 2/2013 | Rimini et al. |
| 2013/0089009 A1 | 4/2013 | Li et al. |
| 2013/0102254 A1 | 4/2013 | Cyzs et al. |
| 2013/0114468 A1 | 5/2013 | Hui et al. |
| 2013/0155913 A1 | 6/2013 | Sarca |

(56) References Cited

U.S. PATENT DOCUMENTS

| | | |
|---|---|---|
| 2013/0166259 A1 | 6/2013 | Weber et al. |
| 2013/0194984 A1 | 8/2013 | Cheng et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0259343 A1 | 10/2013 | Liu et al. |
| 2013/0301487 A1 | 11/2013 | Khandani |
| 2013/0301488 A1 | 11/2013 | Hong et al. |
| 2013/0308717 A1 | 11/2013 | Maltsev et al. |
| 2014/0011461 A1 | 1/2014 | Bakalski et al. |
| 2014/0126437 A1 | 5/2014 | Patil et al. |
| 2014/0169236 A1 | 6/2014 | Choi et al. |
| 2014/0185533 A1 | 7/2014 | Haub |
| 2014/0206300 A1 | 7/2014 | Hahn et al. |
| 2014/0219139 A1 | 8/2014 | Choi et al. |
| 2014/0219449 A1 | 8/2014 | Shattil et al. |
| 2014/0313946 A1 | 10/2014 | Azadet |
| 2014/0348018 A1 | 11/2014 | Bharadia et al. |
| 2014/0348032 A1 | 11/2014 | Hua et al. |
| 2014/0376416 A1 | 12/2014 | Choi |
| 2015/0156003 A1 | 6/2015 | Khandani |
| 2015/0156004 A1 | 6/2015 | Khandani |
| 2015/0215937 A1* | 7/2015 | Khandani ............. H04W 76/02 370/277 |
| 2015/0249444 A1 | 9/2015 | Shin et al. |
| 2015/0303984 A1 | 10/2015 | Braithwaite |
| 2016/0218769 A1* | 7/2016 | Chang ...................... H04B 1/48 |

FOREIGN PATENT DOCUMENTS

| | | |
|---|---|---|
| EP | 2237434 A1 | 10/2010 |
| EP | 2267946 A2 | 12/2010 |
| RU | 2256985 C2 | 7/2005 |
| WO | 2013173250 A1 | 11/2013 |
| WO | 2013185106 A1 | 12/2013 |
| WO | 2014093916 A1 | 6/2014 |

OTHER PUBLICATIONS

Bharadia et al., "Full Duplex Radios" SIGOMM, Aug. 12-16, 2013, Hong Kong, China, Copyright 2013 ACM 978-1-4503-2056-6/6/13/08, 12 pages.

* cited by examiner

METHOD FOR PILOT SIGNAL BASED SELF-INTEFERENCE CANCELLATION TUNING

CROSS-REFERENCE TO RELATED APPLICATIONS

This application claims the benefit of U.S. Provisional Application No. 62/109,126, filed on 29 Jan. 2015, which is incorporated in its entirety by this reference.

TECHNICAL FIELD

This invention relates generally to the wireless communications field, and more specifically to new and useful methods for pilot signal based self-interference cancellation tuning.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference. While progress has been made in this area, many of the solutions intended to address self-interference fall short in performance, especially when re-tuning self-interference cancellation systems. Thus, there is a need in the wireless communications field to create new and useful methods for pilot signal based self-interference cancellation tuning. This invention provides such new and useful methods.

DESCRIPTION OF THE PREFERRED EMBODIMENTS

Figure 1:
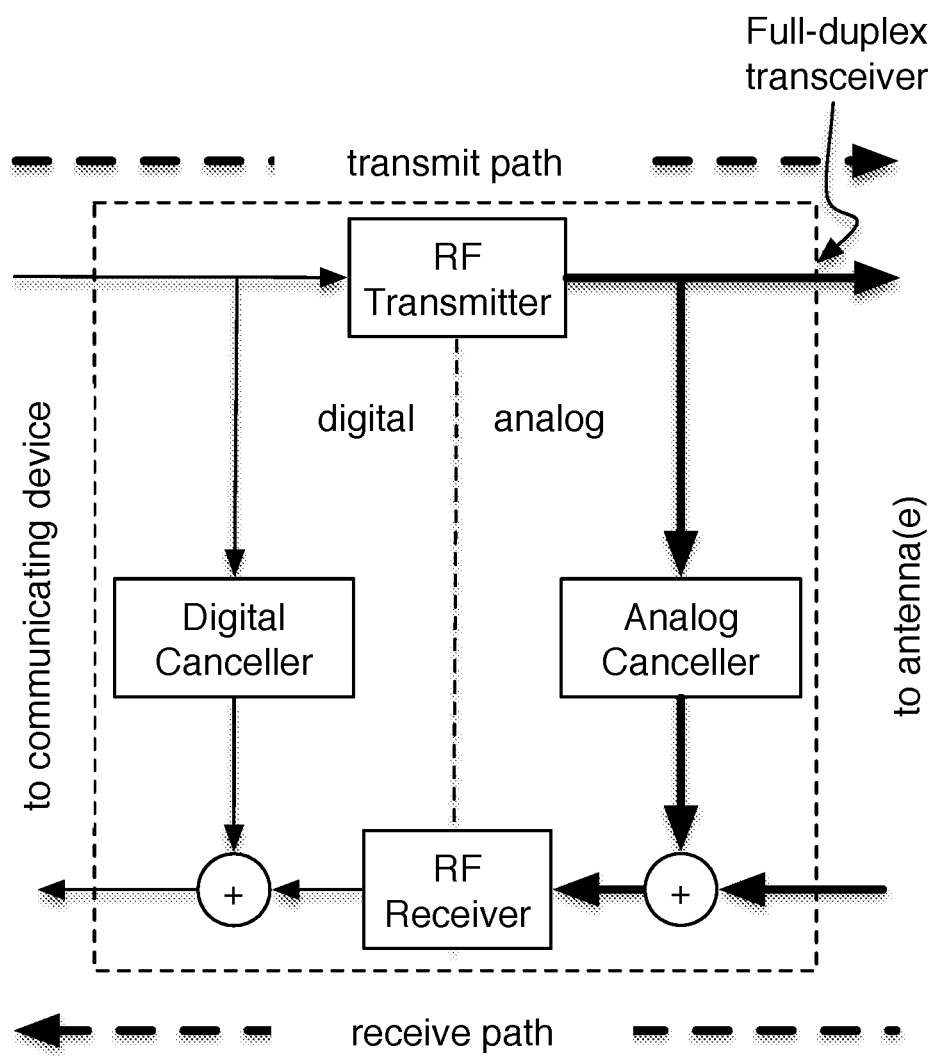
FIG. 1 is a schematic representation of a full-duplex transceiver.

The following description of the preferred embodiments of the invention is not intended to limit the invention to these preferred embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource ever scarcer. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband digital signals, intermediate frequency (IF) analog signals, or as radio-frequency (RF) analog signals, but full-duplex transceivers may additionally or alternatively sample transmission output in any suitable manner. This sampled transmission output may be used by full-duplex transceivers to remove interference from received wireless communications data (e.g., as RF/IF analog signals or baseband digital signals). In many full-duplex transceivers, an analog self-interference cancellation system is paired with a digital self-interference cancellation system. The analog cancellation system removes a first portion of self-interference by summing delayed and scaled versions of the RF transmit signal to create an RF self-interference cancellation signal, which is then subtracted from the RF receive signal. Alternatively, the analog cancellation system may perform similar tasks at an intermediate frequency. After the RF (or IF) receive signal has the RF/IF self-interference cancellation signal subtracted, it passes through an analog-to-digital converter of the receiver (and becomes a digital receive signal). After this stage, a digital self-interference cancellation signal (created by transforming a digital transmit signal) is then subtracted from the digital receive signal.

Full-duplex transceivers often include tuning systems that adjust tunable parameters of the analog self-interference cancellation system in order to adapt the analog self-interference cancellation signal to changing self-interference conditions. Likewise, full-duplex transceivers may similarly include tuning systems that alter the transform configuration of digital self-interference cancellation systems for the same purpose.

Well-tuned digital and analog self-interference cancellation systems are generally effective for reducing interference, but tuning in these systems is often a time-consuming process. This poses a problem: the longer a system takes to retune, the more likely it is that the system will be unable to adapt to rapidly changing self-interference characteristics. Consequently, the usefulness of full-duplex transceivers may be limited.

The methods described herein increase tuning performance of full-duplex transceivers as shown in FIG. 1 (and other applicable systems) by performing preliminary tuning based on injected pilot signals, thus allowing for increased effectiveness in self-interference cancellation. Other applicable systems include active sensing systems (e.g., RADAR), wired communications systems, wireless communications systems, and/or any other suitable system, including communications systems where transmit and receive bands are close in frequency, but not overlapping.

2. Method for Pilot-Signal-Based Self-Interference Cancellation Tuning

Figure 2:
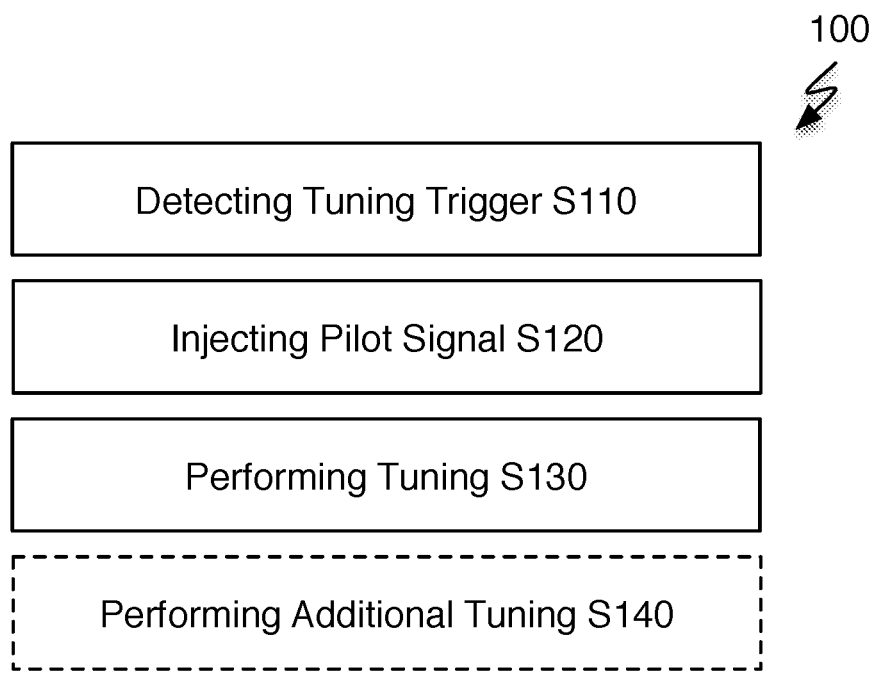
FIG. 2 is a chart representation of a method of a preferred embodiment.
Figure 6:
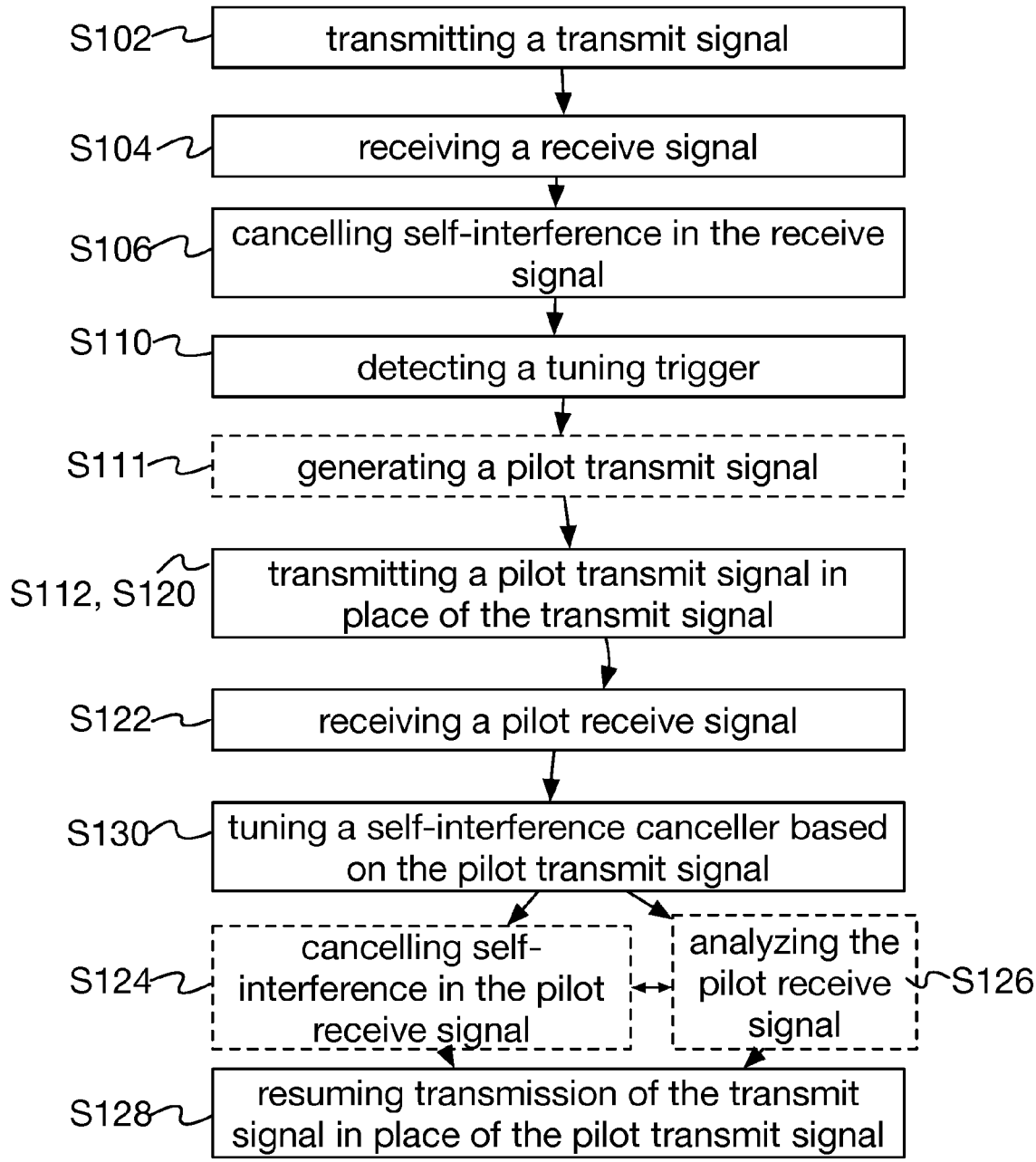
FIG. 6 is a flowchart representation of a method of an example embodiment, including pausing of normal transmission while tuning.

As shown in FIG. 2, a method 100 for pilot-signal-based self-interference cancellation tuning includes detecting a tuning trigger S110, transmitting a pilot transmit signal S120, and tuning a self-interference canceller based on the pilot signal S130. As shown in FIGS. 2 and 6, the method 100 may additionally include: transmitting a transmit signal S102, receiving a receive signal S104, cancelling self-interference in the receive signal S106, generating a pilot transmit signal Sill, pausing transmission of the transmit signal S112, receiving a pilot receive signal S122, canceling self-interference in the pilot receive signal S124, analyzing the pilot receive signal S126, pausing transmission of the pilot transmit signal S128, and performing additional tuning S140.

The method 100 functions to increase the tuning performance of full-duplex transceivers (or other applicable systems) by performing tuning based on a pilot signal or other test signal injected into transmitted signals. Typical signals transmitted by a full-duplex transceiver may have high variability that may make tuning based on such signals difficult; the pilot transmit signal preferably has known qualities that reduce tuning difficulty and/or tuning time. In some cases, tuning based solely on the pilot signal may be sufficient to reduce self-interference in normal communication; if not, the method 100 may also include performing additional tuning based on regular transmit signals.

The method 100 preferably operates as part of a tuning circuit (or other tuning system) coupled to analog and/or digital self-interference cancellation systems.

Analog Self-Interference Cancellation

Figure 3:
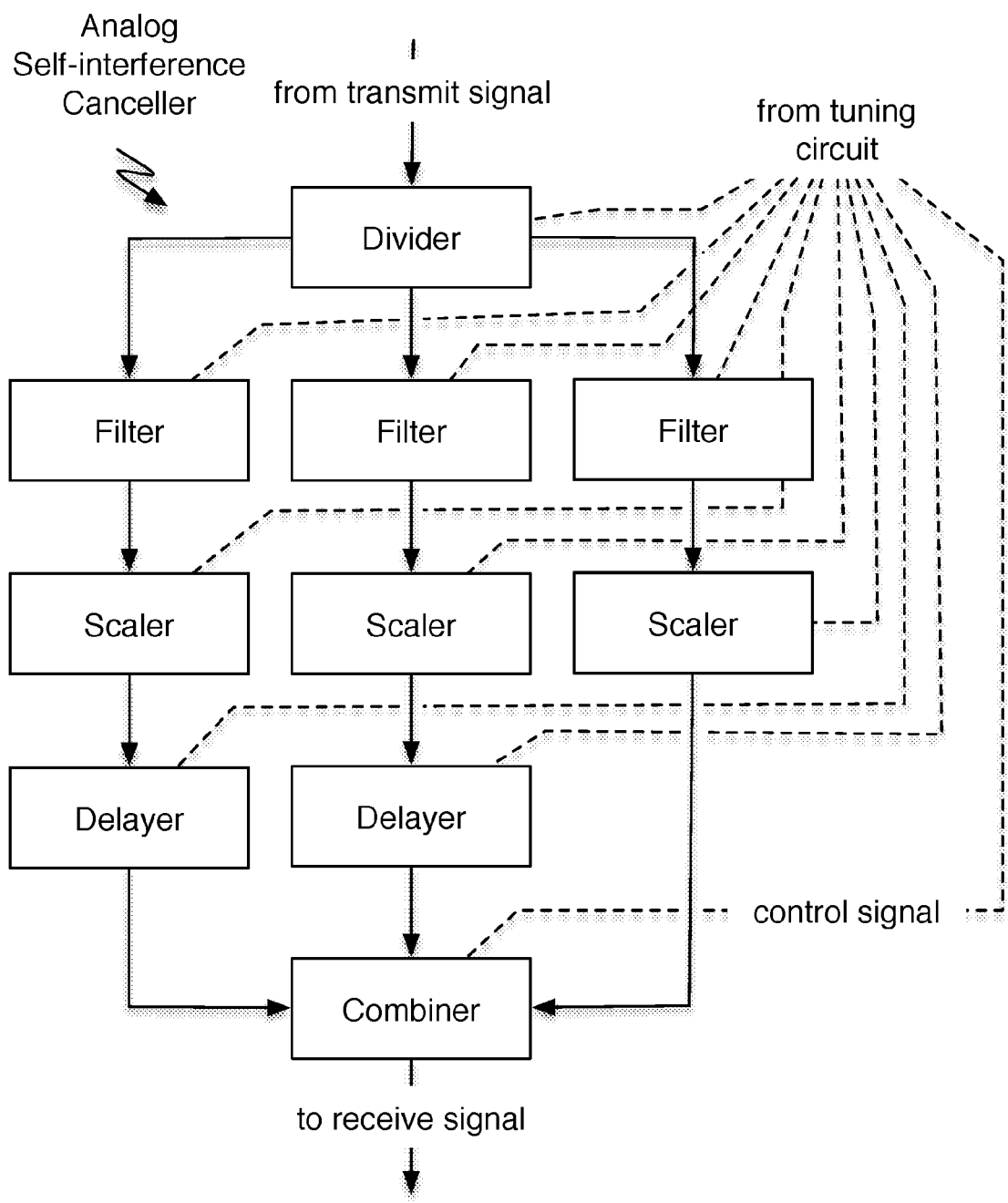
FIG. 3 is a diagram representation of an analog self-interference canceller.

An exemplary analog self-interference cancellation system tunable by the method 100 is as shown in FIG. 3. The analog self-interference canceller functions to produce an analog self-interference cancellation signal from the analog transmit signal that can be combined with the analog receive signal to reduce self-interference present in the analog receive signal. The analog self-interference canceller is preferably designed to operate at a single frequency band, but may additionally or alternatively be designed to operate at multiple frequency bands. Designing the analog self-interference canceller to operate at a single frequency band may reduce design compromises that may be made when designing for multiple frequency bands.

The analog self-interference canceller is preferably implemented as an analog circuit that transforms an analog transmit signal into an analog self-interference cancellation signal by combining a set of filtered, scaled, and/or delayed versions of the analog transmit signal, but may additionally or alternatively be implemented as any suitable circuit. For instance, the analog self-interference canceller may perform a transformation involving only a single version or copy of the analog transmit signal. The transformed signal (the analog self-interference cancellation signal) preferably represents at least a part of the self-interference component received at the receiver.

The analog self-interference canceller is preferably adaptable to changing self-interference parameters in addition to changes in the analog transmit signal; for example, transceiver temperature, ambient temperature, antenna configuration, humidity, and transmitter power. Adaptation of the analog self-interference canceller is preferably performed by the tuning circuit, but may additionally or alternatively be performed by a control circuit or other control mechanism included in the canceller or any other suitable controller.

Figure 4:
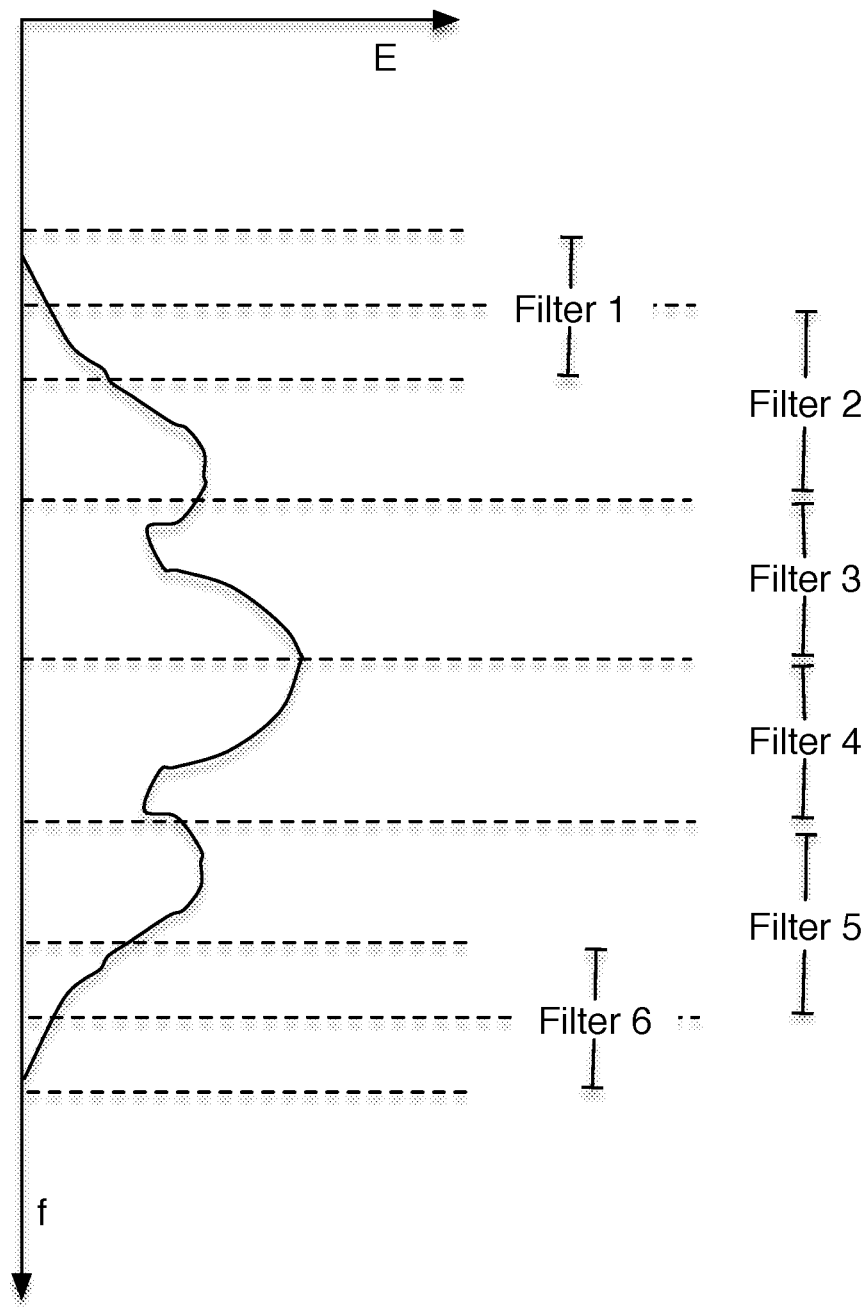
FIG. 4 is a plot representation of filtering a transmit signal.

The exemplary analog self-interference canceller includes a signal divider, filters, scalers, delayers, and a signal combiner. In this implementation, the analog self-interference canceller splits the transmit signal into sub-bands using the filters, as shown in FIG. 4, and transforms each of these sub-bands individually before recombining them at the signal combiner. Note that the frequency sub-bands may overlap in frequency; there may additionally or alternatively be multiple filters corresponding to the same frequency sub-band. Additionally or alternatively, some filters may pass the entire band of interest. Filters are preferably fixed, but may additionally or alternatively be tunable (e.g., have a tunable center frequency or quality factor Q). The analog self-interference canceller preferably transforms each sub-band by scaling (with the scaler) and delaying (with the delayer) signal components of each sub-band. In one implementation of the analog self-interference controller, the filter output is coupled to the scaler input and the scaler output is coupled to the delayer input. In a second implementation, the filter output is coupled to the delayer input, and the delayer output is coupled to the scaler input. The components of the analog self-interference controller may be coupled in any manner that enables analog self-interference cancellation. In one implementation of the analog self-interference controller, each signal path (i.e., each path associated with a different tunable filter) includes both a scaler and a delayer; in an alternate implementation, signal paths may include only one of a scaler and a delayer or neither.

Separating the transmit signal into sub-bands enables the analog self-interference canceller to generate an effective self-interference cancellation signal even when self-interference is highly variable with frequency; for instance, in situations where the full-duplex radio has an antenna configuration not optimized for its RF frequency, where the full-duplex radio is placed in a very strong multipath environment, and/or where the receiver exhibits a substantially frequency-dependent response to RF signal input.

The signal divider functions to split the analog transmit signal into multiple transmit signal paths, each directed to a filter. The signal divider preferably splits the analog transmit signal into multiple analog transmit signals having substantially the same waveform as the input analog transmit signal and equal power; the signal divider may additionally or alternatively split the analog transmit signal into multiple analog transmit signals having different power levels and/or containing different waveforms than the input analog transmit signal. The splitting of the analog transmit signal power between the multiple transmit signal paths is preferably controlled by the tuning circuit, but can alternatively be actively or passively controlled by any suitable system. For example, the tuning circuit can control the power distribution across the multiple transmit signal paths using the signal divider. The signal divider is preferably a transmission line power divider, but may additionally or alternatively be any suitable power divider, splitter, or coupler. The signal divider may additionally contain any suitable electronics for pre-processing the analog transmit signal; for example, the signal divider may contain an amplifier to increase the power contained in one or more of the output RF transmit signals.

Each filter functions to isolate analog transmit signal components contained within a frequency band (typically, but not always, a sub-band of the analog transmit signal band) so that the component of self-interference resulting from the part of the analog transmit signal in that frequency band may be generated independently of the components of self-interference resulting from other parts of the analog transmit signal. As previously discussed, isolating analog transmit signal components by frequency sub-band allows for transformations to be performed on each signal component individually, increasing self-interference cancellation performance in situations where self-interference is substantially frequency dependent.

The filters are preferably bandpass filters centered around a frequency (referred to as the filter center frequency). The filters are preferably fixed, but may additionally or alternatively be tunable, such that the bandpass is centered around an adjustable center frequency. Additionally or alternatively, the filters may be any other suitable type of filter. The filters are preferably passive filters, but may additionally or alternatively be active filters. The filters are preferably implemented with analog circuit components, but may additionally or alternatively be digitally implemented. In variations including tunable filters, the center frequency of each tunable filter is preferably controlled by the tuning circuit, but may additionally or alternatively be controlled by any suitable system (including manually controlled, e.g. as in a mechanically tuned capacitor). Each tunable filter preferably has a set quality (Q) factor, but may additionally or alternatively have a variable Q factor. The tunable filters may have different Q factors; for example, some of the tunable filters may be high-Q, some may be low-Q, and some may be no-Q (flat response).

The scalers function to scale analog transmit signal components; specifically, the scalers effectively multiply the analog transmit signal components by a scale factor. For example, an attenuation of 34% might be represented as a scale factor of 0.66; a gain of 20% might be represented as a scale factor of 1.20; and an attenuation of 10% and a phase inversion might be represented as a scale factor of −0.90. The scalers provide the weighting for the combination of analog self-interference components at the signal combiner (e.g., a signal with scale factor 2 is weighted twice as heavily as one with a scale factor of 1).

The scalers may include attenuators, amplifiers, phase inverters, and/or any other suitable components for scaling analog transmit signal components. Attenuators may be resistive attenuators (T pad, Pi pad), amplifiers with less than unity gain, or any other suitable type of attenuator. Amplifiers may be transistor amplifiers, vacuum tube amplifiers, op-amps, or any other suitable type of amplifier. Phase inverters may be any phase inversion devices, including NPN/PNP phase inversion circuits and/or inverting amplifiers.

The scalers preferably are capable of attenuation, gain, and phase inversion, but may alternatively be capable only of a subset of said capabilities. Each scaler preferably includes all three capabilities in a single device (e.g., an amplifier with tunable gain and two outputs, one inverted and one non-inverted) but may additionally or alternatively separate capabilities into different sections (e.g., an amplifier with tunable gain but no inversion capability, along with a separate phase inversion circuit). The scalers are preferably controlled by the tuning circuit, but may additionally or alternatively be controlled in any suitable manner. The tuning circuit preferably controls scalers by dynamically setting scale factors for each scaler, but may additionally or alternatively control scalers in any suitable manner.

The delayers function to delay analog transmit signal components. The delay introduced by each delayer (also referred to as a delayer delay) is preferably variable (i.e., the delayer is a variable delayer), but delayers may additionally or alternatively introduce fixed delays. The delayer may delay time and/or phase of a signal. The delayer can be a phase delayer, which introduces a phase delay that is constant versus frequency. The delayer can alternatively be a time delayer, which introduces a phase delay that is substantially linear versus frequency, resulting in substantially constant time delay of the signal versus frequency. However, the delayer can additionally or alternatively be any suitable type or combination of delayers. The delayer is preferably implemented as an analog delay circuit (e.g., a bucket-brigade device, a long transmission line, a series of RC networks) but may additionally or alternatively be implemented in any other suitable manner. If the delayer is a variable delayer, the delay introduced is preferably set by the tuning circuit, but may additionally or alternatively be set in any suitable manner. After transformation by a scaler and/or a delayer, analog transmit signal components are transformed into analog self-interference cancellation signal components, which may be combined to form an analog self-interference cancellation signal.

The signal combiner functions to combine the analog self-interference cancellation signal components into an analog self-interference cancellation signal; the analog self-interference cancellation signal may then be combined with an analog receive signal to remove self-interference. The signal combiner preferable combines analog self-interference cancellation signal components (resulting from multiple signal paths) and outputs the resulting analog self-interference cancellation signal. The signal combiner is preferably a transmission line coupler, but may additionally or alternatively be any suitable type of coupler. The signal combiner is preferably a passive device, but can alternatively be an active device (e.g., a device amplifying the analog self-interference cancellation signal components in variable amounts). In variations including an active signal combiner, the signal combiner is preferably controlled by the tuning circuit, but can additionally or alternatively be controlled by any other suitable system. The signal combiner may additionally contain any suitable electronics for post-processing the analog self-interference cancellation signal before outputting it; for example, the signal combiner may contain an amplifier to increase the power of the analog self-interference cancellation signal.

Digital Self-Interference Cancellation

The digital self-interference canceller functions to produce a digital self-interference cancellation signal from a transmit signal. The digital self-interference cancellation signal is preferably combined with the receive signal to further reduce self-interference present at the receiver. Additionally or alternatively, the digital self-interference cancellation signal may be converted to an analog self-interference cancellation signal (by a DAC) and combined with a receive signal.

The digital self-interference canceller preferably samples a digital transmit signal (additionally or alternatively, the canceller may sample an analog transmit signal of the transmitter using an ADC, or any other suitable transmit signal) and transforms the digital transmit signal (or sampled and converted analog transmit signal) to a digital self-interference cancellation signal based on a digital transform configuration. The digital transform configuration preferably includes settings (e.g., configuration parameters) that dictate how the digital self-interference canceller transforms the digital transmit signal to a digital self-interference cancellation signal (e.g., coefficients of a generalized memory polynomial used to transform the transmit signal to a self-interference signal, or a description and/or implementation of a mathematical function used to transform the transmit signal to a self-interference signal, etc.).

The digital self-interference canceller may be implemented using a general-purpose processor, a digital signal processor, an application specific integrated circuit (ASIC), a field programmable gate array (FPGA) and/or any suitable processor(s) or circuit(s). The digital self-interference canceller preferably includes memory to store configuration data (e.g., configuration parameters), but may additionally or alternatively be configured using externally stored configuration data or in any suitable manner. In one implementation, the digital self-interference canceller is substantially similar to the digital self-interference canceller of U.S. patent application Ser. No. 14/456,320, filed 11 Aug. 2014, which is incorporated in its entirety by this reference.

Tuning Circuit

Figure 5:
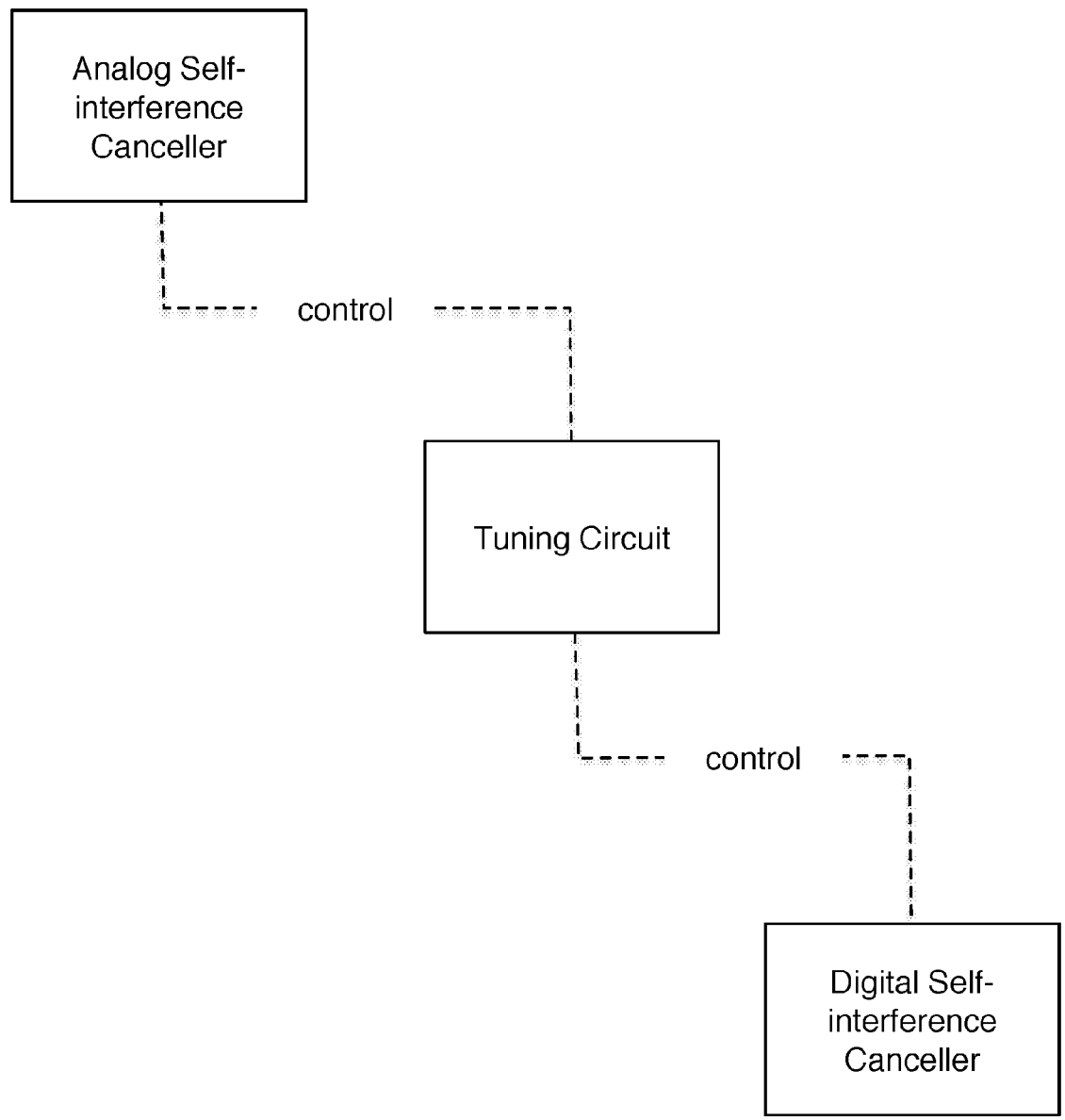
FIG. 5 is a diagram representation of a tuning circuit.

The tuning circuit, as shown in FIG. 5, functions to control the configuration parameters of the analog self-interference canceller. The tuning circuit may additionally or alternatively provide input to or control configuration parameters of the digital self-interference canceller. Configuration parameters may include pre-processing settings (at signal dividers), filter center frequency and/or Q factor (at tunable filters), scale factor (at the scalers), delay (at the delayers), post-processing settings (at the signal combiner) and/or any other suitable configuration parameters. The tuning circuit preferably controls signal divider pre-processing settings, tunable filter center frequencies, scaler scale factors (including gain/attenuation/phase inversion), delayer delays, signal combiner post-processing settings to create radio-frequency (RF) and/or intermediate-frequency (IF) self-interference cancellation signals that cancel (or remove, nullify, negate, etc.) some or all of the self-interference contained within received signals. Additionally or alternatively, the tuning circuit can control a subset of these configuration parameters, or the configuration parameters can be controlled in any other suitable manner by any other suitable system.

The tuning circuit preferably sets the configuration state of the self-interference canceller (where the state includes settings for each variable setting and/or configuration parameter controlled by the tuning circuit) based upon the receive signal and/or the pilot receive signal, but may additionally or alternatively set the configuration state based on any other suitable input. Suitable input may include signal data (e.g. IF transmit signal, digital transmit signal, RF receive signal), full-duplex radio settings (e.g. RF transmitter power, antenna position), full-duplex radio characteristics (e.g. receiver operating characteristics, transmitter operating characteristics), environmental data (e.g., transceiver temperature, ambient temperature, ambient humidity), and/or any other input relating to self-interference present in the receive signal.

The tuning circuit preferably sets configuration states based on an algorithm responsive to input. This may include a state-choosing algorithm that selects from a set of pre-chosen states based on some input parameter set, a dynamic algorithm that generates states based on the input parameter set (as opposed to choosing from a limited state set), or any other suitable algorithm. Additionally or alternatively, the tuning circuit may set configuration states in any suitable manner.

The tuning circuit may adapt configuration states and/or configuration state generating/choosing algorithms using analytical methods, online gradient-descent methods (e.g., least-mean-squares (LMS), recursive least squares (RLS)), and/or any other suitable methods. The tuning circuit may additionally or alternatively adapt configuration states and/or configuration state generating/choosing algorithms based on test input scenarios (e.g. scenarios when the signal received by the receiver is known), scenarios where there is no input (e.g. the only signal received at the receiver is the signal transmitted by the transmitter), or scenarios where the receive signal is unknown. In cases where the receive signal is an unknown signal, the tuning circuit may perform adaptation based on historical received data (e.g. what the signal looked like ten seconds in the past) or any other suitable information. The tuning circuit may additionally or alternatively incorporate historical received data into a predictive analysis that guides adaptation of the configuration state of the self-interference canceller; for example, the tuning circuit may analyze historical received data to identify a particular pattern of self-interference that commonly appears in receive signals. The particular pattern can be linked to a set of configuration parameters (e.g., parameters known to enhance self-cancellation performance for signals expressing the particular pattern), or the particular pattern can be used as an input to an algorithm that generates a set of configuration parameters. However, the particular pattern can additionally or alternatively be analyzed in any suitable manner to inform the tuning process. Once identified and analyzed, the particular pattern of self-interference (or information derived from the particular pattern, e.g., a linked set of configuration parameters) is used to adapt the configuration state of the self-interference canceller, in order to enhance tuning speed and performance. The tuning circuit may additionally or alternatively perform adaptation based on the content of the transmit signals; for instance, if the transmit signal is modulated in a particular way, the tuning circuit may perform adaptation such that when the self-interference cancellation signal is combined with the receive signal the detected modulation (as an indicator of self-interference) is reduced.

The tuning circuit is preferably implemented as a programmable digital circuit, but may additionally or alternatively be implemented in any suitable digital or analog circuit, including implementation as software in a general purpose computing device.

Tuning Trigger

Step S110 includes detecting a tuning trigger. Step S110 functions to identify that a self-interference canceller may need tuning. Step S110 can additionally or alternatively function to provide trigger data to the tuning circuit, such as the type of tuning that may be necessary (e.g., linear tuning, nonlinear tuning, tuning of a specific self-interference canceller among a plurality of self-interference cancellers, etc.). Trigger data can additionally or alternatively be any suitable data related to the detection of a tuning trigger. Tuning triggers are preferably detected as a result of degradation in self-interference cancellation performance, but may additionally or alternatively be detected as a result of any other suitable event or metric (e.g., elapsed time since last tuning, detection of predetermined or historically received signal patterns, change in transmit signal power or receive signal power, etc.). Tuning triggers may also be manually initiated (e.g., a system administrator may request tuning).

A manually initiated tuning trigger may be used, for example, to test the installation of a communications system (or a self-interference cancellation module, etc.). In this scenario, the tuning signal (or multiple tuning signals) may be chosen to test a range of self-interference cancellation performance attributes. For example, a tuning signal that tests the responsiveness of cancellation tuning to sudden changes in signal frequency (or in multipath reflections, etc.) may be used to provide information about the robustness of cancellation to changing signal characteristics. Such information may be used to modify the system or the system installation (e.g., moving a transmitter).

Some sources of tuning triggers include signal data (e.g., IF transmit signal, digital and/or analog transmit signal, RF receive signal), full-duplex radio settings (e.g. RF transmitter power, antenna position), full-duplex radio characteristics (e.g. receiver operating characteristics, transmitter operating characteristics), environmental data (e.g., transceiver temperature, ambient temperature, ambient humidity), elapsed time, and/or any other input relating to self-interference present in the receive signal. Other sources of tuning triggers include spontaneous external instructions (e.g., an operator sending a tuning request), preset instructions (e.g., settings that initiate tuning at specified time intervals), or any other suitable tuning trigger source.

Tuning triggers preferably occur when source data values cross some threshold (e.g., a trigger occurs when RF transmit power exceeds 100 W, a trigger occurs when a digital transmit signal drops in power more than 20% in a time period less than 100 ms, a trigger occurs when transmitter temperature changes more than 5 degrees Celsius from the temperature at the last tuning) or in response to changes in state (e.g., in response to a change in transmit signal frequency). Tuning triggers can additionally or alternatively occur when a pattern in the receive signal (or the self-interference of the receive signal, the data value of any other source, etc.) is observed (e.g., when frequency content known to correspond to self-interference is detected in the receive signal, when source data values cross a threshold a certain number of times or in a certain sequence, etc.). Tuning triggers may additionally or alternatively be generated from trigger sources in any suitable manner.

The detection of tuning triggers is preferably directly linked to self-interference cancellation performance, but may additionally or alternatively be indirectly linked or not linked to self-interference cancellation performance. Self-interference cancellation performance may be monitored in any suitable manner; for example, received signal power may serve as an analogue for self-interference cancellation performance, and the received signal power can directly link to detection of a tuning trigger. If it is known that received signals will have power of at most 10 dBm, any power above this level may be caused from self-interference or other noise, and measuring such a power above this level can initiate tuning via a tuning trigger. As another example, self-interference cancellation performance may be estimated by comparing signals received when the communication system's transmitter is active to signals received when the transceiver's transmitter is inactive, and a tuning trigger may be detected as a result of the estimate.

Tuning triggers are preferably detected by monitoring transmit and/or receive signals of a full-duplex transceiver, but may additionally or alternatively be detected by monitoring other system characteristics (e.g., receiver temperature, transmitter temperature), receiving instructions (e.g., a command by an operator to tune the system), or from analysis of transmit and/or receive signals (e.g., the frequency spectrum of the receive signal). Tuning triggers can additionally or alternatively be detected by monitoring any other suitable data source.

Pilot Signals

Step S120 includes transmitting a pilot transmit signal. Step S120 preferably functions to introduce a test signal into a transmitter transmit path, the test signal having qualities that enable self-interference cancellation tuning to be performed more effectively than with transmit signals used for communication purposes. Step S120 is preferably performed in response to detection of a trigger in Step S110, but may additionally or alternatively be performed for any reason at any time (e.g., Step S120 may be performed continuously and/or simultaneously with Step S102).

The pilot signal (i.e., the pilot transmit signal) is preferably an analog signal injected into the transmit path prior to power amplification and transmission; additionally or alternatively, the pilot signal may be injected into the transmit path after power amplification or in any other suitable location. As another alternative, the pilot signal may be transmitted by the transmitter directly after selection and/or generation, with or without power amplification. As a further alternative, the pilot signal may be a digital signal injected into the digital transmit path prior to pre-transmission digital-to-analog conversion. If the pilot signal is injected as an analog signal, it is preferably within the transmit signal band, but may additionally or alternatively be spectrally located in any suitable frequency band (including baseband).

Figure 8A:
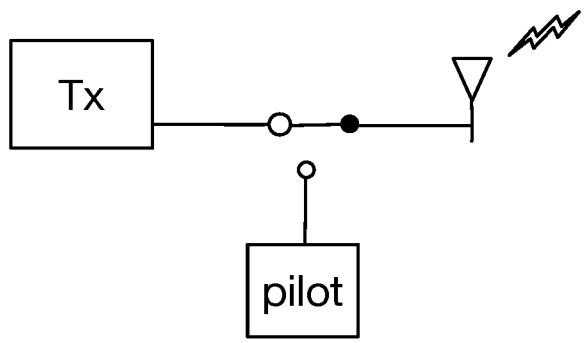
FIGS. 8A-B are diagram representations of states of a system implementing an example embodiment of the method.
Figure 8B:
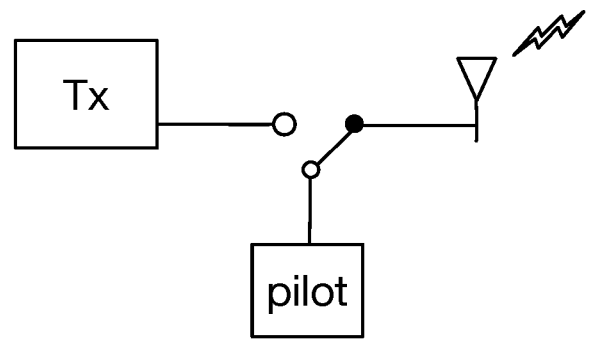

Step S120 preferably includes pausing transmission of the transmit signal while transmitting the pilot transmit signal, as depicted schematically in FIGS. 8A-B; that is, normal communication is temporarily halted in place of pilot signal transmission. In this case, the pilot signal preferably has substantially similar power characteristics (e.g., average power vs. frequency) to typical transmit signals; additionally or alternatively, the pilot signal may have any suitable power characteristics. Step S120 can additionally or alternatively include stifling (e.g., attenuating) transmission of the transmit signal while transmitting the pilot transmit signal; for example, the transmit power of the transmit signal can be lowered/attenuated during transmission of the pilot transmit signal, such that the pilot signal power is significantly greater (e.g., 15 dB greater) than the transmit signal power.

Alternatively, Step S120 may include transmitting the pilot transmit signal without pausing and/or stifling normal transmission. For example, the pilot signal may be injected in a guard band outside of the RX/TX (receive/transmit) band during normal transmission. In another example, the pilot transmit signal may be transmitted within the RX/TX band during normal transmission, and the average power of the pilot transmit signal is lower (e.g., by 15 dB) than the average power of the normal transmission (e.g., the transmit signal).

The pilot signal preferably has a well-known autocorrelation function that distinguishes it from other signals (e.g., typical transmit signals); this enables the pilot signal to be easily detectable within the received signal (where it is present as self-interference). If the pilot signal is easily detectable within the received signal, the magnitude of the signal (and associated autocorrelation) can be used to estimate the residual self-interference, which can in turn be used to tune self-interference cancellation. The pilot transmit signal can additionally or alternatively have any suitable autocorrelation function.

The pilot signal may be any suitable signal. For example, the pilot signal may be an un-modulated single-frequency sine wave. An un-modulated single-frequency sine wave may facilitate simple detection of harmonics (resulting from self-interference) in the pilot receive signal. As another example, the pilot signal may consist of a combination (e.g., superposition) of several sine waves at different frequencies. A third example, the pilot signal may consist of chirp signals (e.g., chirps, signal pulses containing wideband frequency content, etc.). As a fourth example, the pilot signal may consist of white noise (or any other suitable noise, e.g., pink noise, brown noise, etc.). As a fifth example, the pilot signal may be a cyclic prefix signal.

Pilot signals may be chosen to tune a cancellation system overall, but may additionally or alternatively be chosen to specifically tune some aspect of cancellation system performance. For example, a single tone pilot (or set of single tone pilots) may be useful to capture and tune for frequency-dependent phenomena like phase-noise modeling and Doppler modeling.

In a first variation of a preferred embodiment, Step S120 includes selecting a pilot transmit signal for transmission based upon the trigger detected in Step S110. In this variation, Step S120 functions to choose an appropriate pilot transmit signal for the particular event that precipitates tuning (e.g., the tuning trigger). Detecting the trigger in this variation may additionally or alternatively include receiving trigger data that aids selection of a pilot transmit signal (e.g., an encoded signal that indicates degraded self-interference performance at a particular range of frequencies, and therefore prompts the selection of a pilot transmit signal that is within the particular range). The pilot transmit signal may be selected from a set of pilot transmit signals, or selecting the pilot transmit signal can include generating the pilot transmit signal (e.g., from an algorithm that takes the tuning trigger and/or trigger data as input). The pilot transmit signal can additionally or alternatively be selected and/or generated in any suitable manner.

In a specific example of the first variation, Step S120 may include using a single-tone pilot signal in response to a trigger related to changes in linear components of the self-interference (e.g., the change in the self-interference channel requires tuning of portions of the self-interference canceller responsible for cancelling linear self-interference), and the fact that a linear change has occurred is encoded in trigger data contained within the detected trigger. The trigger data is analyzed, and as a result of the analysis a single-tone pilot transmit signal is selected from a set of candidate pilot transmit signals. The set of pilot transmit signals may be stored locally at the communication system, remotely from the communication system (e.g., in a database of pilot signals from which the selected pilot signal can be retrieved), or in any other suitable memory location from which the pilot transmit signal can be selected. In this specific example, a change in nonlinear components of the self interference can lead to detection of a trigger related to a nonlinear change (e.g., the trigger includes trigger data indicative of a nonlinear change), leading to selection of a multi-tone pilot signal that can enable tuning of portions of the self-interference canceller responsible for cancelling nonlinear self-interference.

Figure 7:
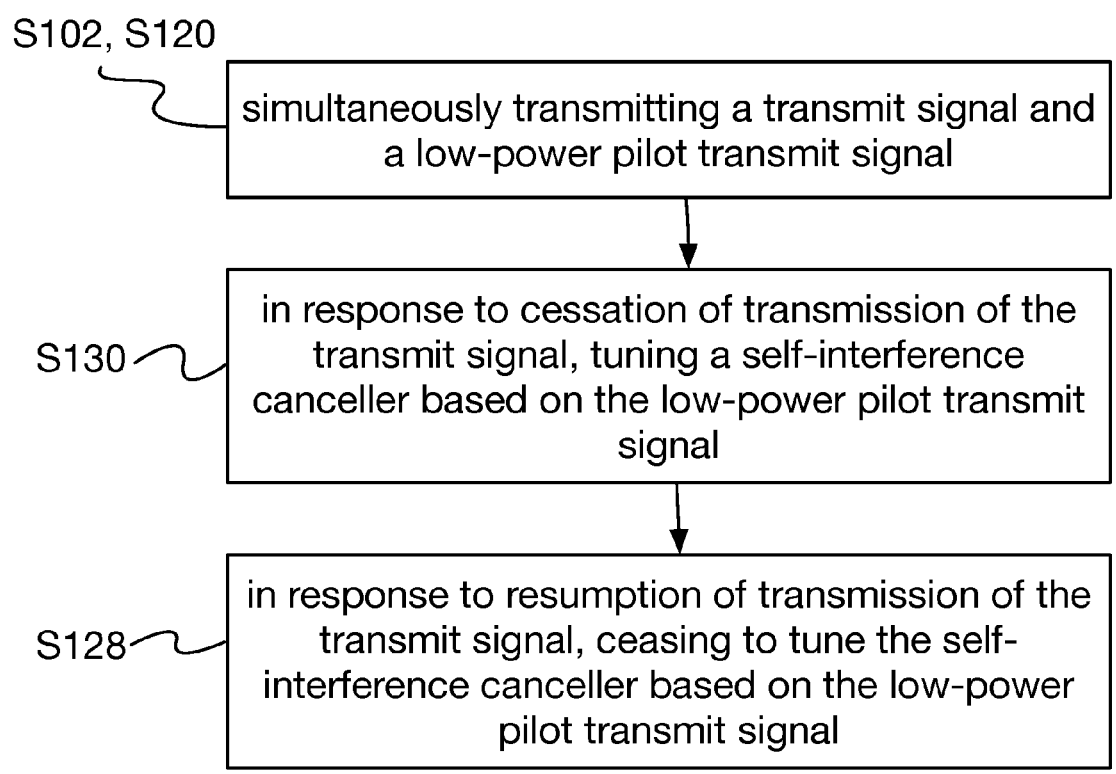
FIG. 7 is a flowchart representation of a method of an example embodiment, including opportunistic tuning during normal transmission.

In a second variation of a preferred embodiment, Step S120 includes transmitting a pilot transmit signal within the main RX/TX band continuously. A flowchart version of this variation is depicted in FIG. 7. The pilot transmit signal is preferably of significantly lower power than the transmit signal (e.g., 10 dB less, 15 dB less, 20 dB less, etc.), but can alternatively be of similar power. In this variation, Step S120 functions to provide a signal that, during normal transmission, does not substantially affect communication (e.g., by noticeably modifying the desired transmit signal); when transmission ceases, however, the low-power pilot signal may be used to tune self-interference cancellation. This continuously transmitted pilot transmit signal can be used to ensure that a self-interference canceller does not go long periods of time without tuning, reducing tuning time when normal transmission resumes. The continuous transmission of the pilot transmit signal also can be used to opportunistically tune the self-interference canceller, without actively halting the transmission of the transmit signal during normal communication periods.

Figure 9:
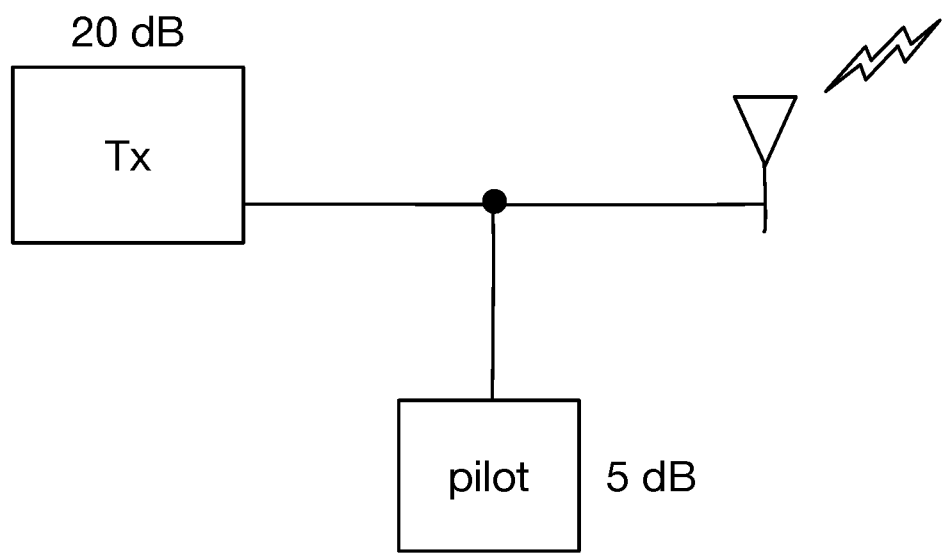
FIG. 9 is a diagram representation of a state of a system implementing an example embodiment of the method.

In a specific example of the second variation, depicted schematically in FIG. 9, Step S120 includes transmitting a pilot transmit signal with a signal power 15 dB less than the average signal power of the transmit signal. When the transmit signal ceases to be transmitted (e.g., during a typical intermittent break in transmission during normal communications), the self-interference canceller is tuned, based on the pilot receive signal that is being continuously received (even in the absence of normal transmission). This allows fast and efficient tuning to take place during periods of downtime in normal transmission, using the well-known pilot transmit signal to aid the tuning process.

In a third variation of a preferred embodiment, pilot signals transmitted by different transmitters have distinct signal characteristics. This may be particularly useful for self-interference cancellation tuning in multiple-in multiple-out (MIMO) systems, where it may be important to distinguish between multiple pilot receive signals at a receiver. For example, a receiver in a MIMO system may receive self-interference contributions from two different transmitters; the MIMO system may include separate self-interference cancellation circuits for each transmitter. The self-interference channel between the first transmitter and the receiver may be different than the self-interference channel between the second transmitter and the receiver, necessitating different and/or independent tuning of the separate self-interference cancellation circuits corresponding to each transmitter. Distinct pilot signals may allow the two cancellation circuits to be easily tuned independently, by facilitating recognition of self-interference from one transmitter (via its corresponding pilot receive signal containing self-interference resulting from the self-interference channel between the first transmitter and the receiver) versus the other (via its corresponding different pilot receive signal, also containing self-interference from the self-interference channel between the second transmitter and the receiver).

Tuning the Self-Interference Canceller

Step S130 includes tuning the self-interference canceller based on the pilot receive signal. Step S130 functions to tune self-interference cancellation systems in order to increase self-interference cancellation performance. Step S130 can additionally or alternatively include analyzing the pilot receive signal; for example, the portion of the receive signal power corresponding to the pilot receive signal can be measured and used as an analogue for the self-interference present in the pilot receive signal. Step S130 is preferably performed as a result of Step S120, transmitting a pilot transmit signal, but can additionally or alternatively be performed as the result of transmitting a transmit signal, or any other suitable Step or event. Step S130 can also additionally or alternatively occur independently of any other Step or event.

Step S130 preferably includes tuning one or more configuration parameters of an analog self-interference canceller. Tuning can include adjusting, adding, removing, or adapting configuration parameters in any suitable manner. Configuration parameters may include pre-processing settings (at signal dividers), filter center frequency and/or Q factor (at tunable filters), scale factor (at the scalers), delay (at the delayers), post-processing settings (at the signal combiner) and/or any other suitable configuration parameters. Tuning configuration parameters can include adjusting multiple parameters in combination to achieve a desired tuning effect, iteratively tuning one or more parameters, or tuning in any other suitable manner.

In particular, configuration parameters adapted by Step S130 with respect to the analog self-interference canceller preferably include signal division parameters (e.g., the frequency-dependent power of the divided signal), scaler scale factors (including gain/attenuation/phase inversion), and delayer delays (e.g., the time delay induced in the signal at a delayer). Configuration parameters may additionally or alternatively include any tunable parameters of the analog self-interference canceller (e.g., center frequencies of tunable filters).

Step S130 may additionally or alternatively provide input to or control configuration parameters of a digital self-interference canceller. For example, Step S130 may include setting a transform configuration of a digital self-interference canceller (i.e., the mathematical function defining how an input transmit signal is converted into a self-interference cancellation signal) according to a least-mean-squares algorithm.

In particular, configuration parameters adapted by Step S130 with respect to the digital self-interference canceller preferably include weight coefficients (e.g., of a polynomial transform function implemented by the digital self-interference canceller, of a numerical quadrature technique implemented by the digital self-interference canceller, etc.), the dynamic range of the digital self-interference canceller, the resolution of the digital self-interference canceller (e.g., of ADCs of the digital self-interference canceller), and sampling rate(s) of the digital self-interference canceller. Step S130 can additionally or alternatively tune any suitable configuration parameters of the digital self-interference canceller.

Step S130 preferably includes setting configuration parameters of the self-interference canceller based on an algorithm responsive to input. Such an algorithm may include a state-choosing algorithm that selects from a set of pre-chosen states based on some input parameter set (e.g., the trigger data, the result of an analysis of the pilot receive signal, etc.), a dynamic algorithm that generates (e.g., analytically determines) states based on the input parameter set (as opposed to choosing from a limited state set), or any other suitable algorithm. Additionally or alternatively, Step S130 may include setting and/or adjusting configuration parameters in any suitable manner.

Step S130 may include adapting configuration states and/or configuration state generating/choosing algorithms using analytical methods, online gradient-descent methods (e.g., LMS, RLS), and/or any other suitable methods.

In one embodiment, Step S130 includes adapting configuration parameters according to a multi-tiered tuning algorithm. For example, if an analog self-interference canceller includes some low-Q filters and some high-Q filters, Step S130 may include tuning the low-Q filters first (to coarsely model phase and frequency response of the overall self-interference channel), and then tuning the high-Q filters (to model fine-grained channel characteristics; e.g., small peaks or localized perturbations).

Parameters may be tuned using any suitable algorithm. For example, tuning parameters may be obtained by solving a linear optimization problem, such as by the Lasso method:

$$\text{minimize} \|y-Aw\|_2^2 + \lambda \|w\|_1, \text{ subject to } w_{min} \leq w \leq w_{max}$$

wherein y represents an observed signal (e.g., the self-interference signal to be cancelled), A represents the response of the self-interference canceller for different tuning parameters, w represents a selected tuning parameter, and $w_{min}$ and $w_{max}$ represent minimum and maximum values, respectively, of the selected tuning parameter.

Non-linear canceller response may be modeled by representing tuning parameters with non-linear effects via columns of the response matrix A, with weights w associated with each of the parameters. A convex optimization solver may then be used to find values for w.

Parameters may also be tuned using a technique known as Alternating Direction Method of Multipliers (ADMM). The ADMM technique splits optimization into two or more partial problems, which may be easier to solve than the original optimization problem. In this technique, solutions to the partial problems are iteratively cross-fed into other partial problems in order to find a final solution.

Step S130 may include using multiple algorithms; for example, Step S130 may include optimizing using RLS for parameters that change quickly, while using LMS for parameters that change more slowly.

More details regarding tuning algorithms can be found in U.S. application Ser. No. 14/643,795, filed on 10 Mar. 2015, the entirety of which is incorporated by this reference.

While Step S130 preferably refers to tuning self-interference cancellers to reduce self-interference, Step S130 may additionally or alternatively be used to compensate for channel effects between transmitters and receivers of separate devices. If the pilot transmit signal is known a priori, it can be detected by a receiver as a pilot signal and compared to a signal reference (i.e., what the receiver 'knows' the pilot signal should look like) in order to estimate noise or distortions in the channel between the receiver and transmitter. Step S130 may then be used to modify the self-interference cancellation signal to further remove noise and distortions present in the communications channel.

Step S140 includes performing additional tuning. Step S140 is preferably substantially similar to Step S130, except that Step S140 is performed in cases where tuning based on the pilot signal reduces some, but not all, of self-interference desired to be removed. For example, Step S130 may involve tuning a self-interference canceller based on a pilot signal while normal transmission is stifled. After normal transmission resumes, the canceller can then be tuned according to the normal transmit signal. In this situation, the pilot signal preferably functions as an idealized version of normal transmission; that is, tuning based on the pilot signal is faster because several variables are removed from the tuning equation and serves as a preliminary coarse tuning, after which point fine tuning can be performed based on the normal transmit signal.

Specific Examples

In a first specific example of the method 200, a transmit signal is transmitted by a transmitter of a communication system (e.g., a full-duplex radio transceiver). A receive signal is simultaneously received at a receiver of the communication system, and the receive signal contains self-interference resulting from an interference channel between the transmitter and the receiver. An analog self-interference canceller of the communication system cancels a portion of the self-interference in the receive signal, resulting in a composite analog receive signal. The composite analog receive signal is converted to a digital receive signal by an analog-to-digital converter, and a portion of the remaining self-interference in the digital receive signal is cancelled by a digital self-interference canceller, resulting in a composite digital receive signal. At any point during the self-interference cancellation, the performance of the analog or digital self-interference canceller may degrade (as determined by analysis of the signal power of the receive signal and/or the digital receive signal), and this degradation can trigger tuning (e.g., be detected as a tuning trigger). In some embodiments of this specific example, the tuning trigger can be detected as a result of the signal power of the receive signal and/or the digital receive signal exceeding a predetermined threshold power. In other embodiments of this specific example, the tuning trigger can be detected as a result of certain frequency content appearing in the receive signal and/or the digital receive signal. As a result of detecting the tuning trigger, the transmission of the transmit signal is halted and a pilot transmit signal is transmitted in its place. At the receiver, a pilot receive signal (resulting from the pilot transmit signal) is received. The analog and digital self-interference cancellers cancel self-interference in the pilot receive signal, resulting in a composite pilot signal, which is then analyzed. The composite pilot signal may be analog (e.g., if it is the result of cancellation by the analog self-interference canceller) or digital (e.g., if it is the result of cancellation by the digital self-interference canceller, after initial cancellation by the analog self-interference canceller). Based on the analysis (e.g., the measured signal power of the composite pilot signal), the analog and/or digital self-interference canceller is tuned in order to reduce the self-interference in the composite pilot signal. In some embodiments, the analog self-interference canceller alone is tuned, depending on the type of the detected tuning trigger. For example, a tuning trigger resulting from the signal power of the receive signal (which, in this example, is an analog signal) exceeding a certain threshold may result in a detected tuning trigger that leads to tuning of the analog self-interference canceller only. In other example embodiments, the digital self-interference canceller alone is tuned, in the case of a tuning trigger resulting from the signal power of the digital receive signal exceeding a certain threshold (which may be the same as the threshold for triggering analog self-interference canceller tuning, but can alternatively be a different threshold). In further example embodiments, both the analog and digital self-interference cancellers are tuned, simultaneously and/or sequentially. The tuning of the self-interference canceller(s) and analysis of the composite pilot signal is performed iteratively, until the amount of self-interference in the composite pilot signal (after either analog self-interference cancellation, digital self-interference cancellation, or both) is reduced below a predetermined threshold, at which point transmission of the transmit signal is resumed and transmission of the pilot transmit signal is paused.

In a second specific example of the method 200, a tuning trigger containing trigger data is detected at a communication system. The tuning trigger is detected at regular time intervals, regardless of the performance of the self-interference canceller. The trigger data includes information regarding the type of pilot transmit signal that is appropriate for tuning (e.g., self-interference cancellation performance data indicating that cancellation has degraded across a wide frequency band, and that a pilot transmit signal including wideband frequency content should be used for tuning). The pilot transmit signal is then generated according to the trigger data (e.g., by way of an algorithm responsive to input that generates the pilot transmit signal, or essential characteristics of the pilot transmit signal, as output) and transmitted at the transmitter of the communication system. The pilot receive signal received at the receiver of the communication system is then analyzed (e.g., the self-interference component of the pilot receive signal is measured), and tuning is then performed as a result of the analysis. In this specific example, tuning includes adjusting the scale factors of scalers (e.g., the gain settings of amplifiers) of the self-interference canceller. As tuning occurs, additional tuning triggers may be detected that contain additional trigger data; the generated pilot transmit signal can be altered during tuning in accordance with the additional trigger data (e.g., the rate of convergence to a suitably tuned self-interference canceller configuration state may be slower than desired, leading to an additional tuning trigger being detected that contains trigger data indicating a type of pilot transmit signal that enables faster convergence). Once the performance of the self-interference canceller has been improved through tuning (e.g., by altering the configuration state of the self-interference canceller), transmission of the pilot transmit signal is halted.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for full-duplex communication. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for pilot signal based self-interference cancellation tuning comprising:
    transmitting, at a transmitter of a communication system, a transmit signal;
    receiving, at a receiver of the communication system, a receive signal;
    cancelling, at a self-interference canceller of the communication system, a portion of self-interference in the receive signal, resulting in a composite receive signal;
    analyzing the composite receive signal;
    generating a tuning trigger in response to analysis of the composite receive signal;
    detecting the tuning trigger;
    in response to the tuning trigger:
        pausing transmission of the transmit signal; and
        transmitting, at the transmitter, a pilot transmit signal;
    receiving, at the receiver, a pilot receive signal;

cancelling, at the self-interference canceller, a portion of self-interference in the pilot receive signal, resulting in a composite pilot signal;

analyzing the composite pilot signal;

tuning a configuration parameter of the self-interference canceller, based on analysis of the composite pilot signal, resulting in reduced self-interference in the composite pilot signal; and pausing transmission of the pilot transmit signal and resuming transmission of the transmit signal.

2. The method of claim 1, wherein analyzing the composite receive signal comprises measuring the signal strength of the composite receive signal.

3. The method of claim 2, further comprising generating the tuning trigger in response to the signal strength of the composite receive signal exceeding a predetermined threshold.

4. The method of claim 1, wherein the self-interference canceller comprises an analog self-interference canceller.

5. The method of claim 4, wherein the analog self-interference canceller comprises a filter, a scaler, and a delayer, and tuning the configuration parameter comprises adjusting at least one of a scale factor of the scaler and a delay of the delayer.

6. The method of claim 1, wherein the self-interference canceller comprises a digital self-interference canceller, the digital self-interference canceller comprising a transform function, and tuning the configuration parameter comprises adjusting a weight coefficient of the transform function.

7. The method of claim 1, wherein the self-interference canceller comprises an analog self-interference canceller and a digital self-interference canceller, and further comprising:

tuning a configuration parameter of the analog self-interference canceller, based on analysis of the composite pilot signal, resulting in removal of a first portion of self-interference from the composite pilot signal by the analog self-interference canceller; and after tuning the configuration parameter of the analog self-interference canceller, tuning a configuration parameter of the digital self-interference canceller, resulting in removal of a second portion of self-interference from the composite pilot signal by the digital self-interference canceller.

8. The method of claim 1, wherein pausing transmission of the pilot transmit signal and resuming transmission of the transmit signal comprises pausing transmission of the pilot transmit signal and resuming transmission of the transmit signal in response to the signal strength of the composite pilot signal power decreasing below a predetermined threshold.

9. The method of claim 1, wherein the transmit signal is transmitted in a first frequency band, the pilot signal is transmitted in a second frequency band, and the first frequency band and the second frequency band are identical.

10. The method of claim 1, wherein the pilot signal is a chirp.

11. The method of claim 1, further comprising analyzing the composite receive signal, and tuning a configuration parameter of the self-interference canceller based on analysis of the composite receive signal.

12. The method of claim 1, wherein tuning the configuration parameter comprises tuning the configuration parameter based on an adaptive online gradient-descent optimization algorithm.

13. A method for pilot signal based self-interference cancellation tuning comprising:

transmitting, at a transmitter of a communication system, a transmit signal;

receiving, at a receiver of the communication system, a receive signal;

detecting a tuning trigger; wherein the tuning trigger is associated with characteristic trigger data; wherein the characteristic trigger data comprises an analysis of the receive signal;

in response to the tuning trigger, generating a pilot transmit signal according to the trigger data; wherein the pilot transmit signal is generated according to the analysis of the receive signal;

transmitting, at the transmitter, the pilot transmit signal;

receiving, at the receiver, a pilot receive signal;

cancelling, at the self-interference canceller, a portion of self-interference in the receive pilot signal, resulting in a composite pilot signal;

analyzing the composite pilot signal; and tuning a configuration parameter of the self-interference canceller, based on analysis of the composite pilot signal, resulting in reduced self-interference in the composite pilot signal.

14. The method of claim 13, wherein generating the pilot transmit signal comprises generating the pilot transmit signal using an algorithm; wherein the algorithm receives the trigger data as an input and outputs the pilot transmit signal.

15. The method of claim 14, wherein using the algorithm comprises selecting the pilot transmit signal from a set of pilot transmit signals, based on the trigger data.

16. The method of claim 15, wherein the set of pilot transmit signals comprises a chirp, an unmodulated sine wave, a superposition of sine waves, and white noise.

* * * * *